US009964195B2

(12) United States Patent
Edler

(10) Patent No.: US 9,964,195 B2
(45) Date of Patent: May 8, 2018

(54) LIMITED-SLIP DRIVELINE APPARATUS

(71) Applicant: EATON CORPORATION, Cleveland, OH (US)

(72) Inventor: Andrew N. Edler, Homer, MI (US)

(73) Assignee: Eaton Intelligent Power Limited (IE)

( * ) Notice: Subject to any disclaimer, the term of this patent is extended or adjusted under 35 U.S.C. 154(b) by 772 days.

(21) Appl. No.: 14/391,448

(22) PCT Filed: Apr. 10, 2013

(86) PCT No.: PCT/US2013/035900
§ 371 (c)(1),
(2) Date: Oct. 9, 2014

(87) PCT Pub. No.: WO2013/155138
PCT Pub. Date: Oct. 17, 2013

(65) Prior Publication Data
US 2015/0111679 A1    Apr. 23, 2015

Related U.S. Application Data

(60) Provisional application No. 61/623,980, filed on Apr. 13, 2012.

(51) Int. Cl.
*F16H 48/27* (2012.01)
*F16H 48/08* (2006.01)
(Continued)

(52) U.S. Cl.
CPC ......... *F16H 48/27* (2013.01); *F16D 25/0635* (2013.01); *F16H 48/08* (2013.01); *F16H 48/20* (2013.01); *F16H 48/22* (2013.01)

(58) Field of Classification Search
None
See application file for complete search history.

(56) References Cited

U.S. PATENT DOCUMENTS 4,012,968 A    3/1977   Kelbel
4,445,400 A    5/1984   Sullivan et al.
(Continued)

FOREIGN PATENT DOCUMENTS

WO    03/083321 A1    10/2003

OTHER PUBLICATIONS

International Search Report for corresponding International Patent Application No. PCT/US2013/035900 dated Jun. 11, 2013.

*Primary Examiner* — Erin D Bishop
(74) *Attorney, Agent, or Firm* — Merchant & Gould P.C.

(57) ABSTRACT

A limited-slip driveline apparatus including a first driveline component that is rotatable relative to a second driveline component. The driveline apparatus also includes a clutch. The driveline apparatus further includes an actuation arrangement for actuating the clutch. The actuation arrangement includes a hydraulic pump that pumps hydraulic fluid through a hydraulic circuit when relative rotation exists between the first and second driveline components. The hydraulic pressure generated by the hydraulic pump within the hydraulic circuit is used to actuate the clutch. The actuation arrangement also includes a flow regulating valve for regulating a hydraulic fluid flow rate through the hydraulic circuit. The flow regulating valve is configured to prevent the hydraulic fluid flow rate from exceeding a set maximum flow rate regardless of a magnitude of the hydraulic pressure in the hydraulic circuit.

24 Claims, 6 Drawing Sheets

(51) Int. Cl.
*F16H 48/20* (2012.01)
*F16H 48/22* (2006.01)
*F16D 25/0635* (2006.01)

(56) References Cited

U.S. PATENT DOCUMENTS

| | | | |
|---|---|---|---|
| 4,679,463 | A | 7/1987 | Ozaki et al. |
| 5,310,388 | A | 5/1994 | Okcuoglu et al. |
| 6,059,680 | A | 5/2000 | Yoshioka |
| 6,332,522 | B1 | 12/2001 | Morse et al. |
| 6,733,411 | B1 | 5/2004 | Kaplan et al. |
| 6,789,657 | B2 | 9/2004 | Schrand et al. |
| 7,104,912 | B2 | 9/2006 | Morgensai |
| 7,353,927 | B2 | 4/2008 | Park |
| 7,361,114 | B2 | 4/2008 | Boddy |
| 7,448,482 | B2 | 11/2008 | Park |
| 8,043,184 | B2 | 10/2011 | Boddy |
| 2006/0019788 | A1 | 1/2006 | Morgensai |
| 2006/0124428 | A1 | 6/2006 | Baxter |

LIMITED-SLIP DRIVELINE APPARATUS

This application is a National Stage Application of PCT/US2013/035900, filed 10 Apr. 2013, which claims benefit of U.S. Patent Application Ser. No. 61/623,980 filed on 13 Apr. 2012, and which applications are incorporated herein by reference. To the extent appropriate, a claim of priority is made to each of the above disclosed applications.

TECHNICAL FIELD

The present disclosure relates generally to limited-slip driveline clutches. More particularly, the present disclosure relates to actuation arrangements for limited-slip driveline clutches.

BACKGROUND

Driveline clutches are used to selectively rotationally couple first and second rotatable driveline components. Limited-slip driveline clutches are driveline clutches that selectively couple first and second rotatable driveline components while concurrently permitting a limited/controlled amount of relative rotation between the first and second rotatable driveline components. One application for a limited-slip driveline clutch is in a differential where the driveline clutch is used to limit the rotational slip that can occur within the differential.

A differential is a component of an axle assembly that is used to transfer torque from a drive shaft to a pair of output shafts. The driveshaft drives the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a gear arrangement that allows torque to be transferred from the driveshaft to the output shafts while concurrently allowing the output shafts to rotate at different speeds as needed.

While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials have been developed to shift power from the wheel that has lost traction to the wheel that is not spinning.

Limited-slip differentials have been developed that use a hydraulically actuated clutch to limit differential rotation between the output shafts of the differential. Such limited-slip differentials can include a pump in the form of a gerotor incorporated into the differential housing. Solenoid valves have been used to precisely control the actuation pressure provided to the clutch. However, to be operable, such valves require an electronic controller and valve control hardware/software. This can be expensive. In contrast, a simple orifice is a relatively inexpensive structure that has been used in combination with a hydraulic pump to generate hydraulic pressure for actuating the clutch. However, a non-compensated orifice will provide very different actuation pressures depending upon the rate of flow output from the hydraulic pump. Example limited-slip differentials are disclosed at U.S. Pat. Nos. 4,012,968; 5,310,388; 6,332,522; 6,733,411; 6,789,657; 7,361,144; 7,448,482; and 8,043,184.

SUMMARY

One aspect of the present disclosure relates to a system that uses a flow regulating valve to control operation of a hydraulically actuated driveline clutch. In certain examples, the flow regulating valve is a pressure compensated flow control valve that prevents a flow rate in the system from exceeding a maximum flow rate set by the valve regardless of a magnitude of the hydraulic pressure in the system. The pressure compensated flow control valve can have a valve member that is spring-biased toward an open position. The use of a flow regulating valve as described above allows for the implementation of an actuation control strategy that relies only on hydraulic fluid flow rate and does not require specific control of the hydraulic pressure of the system. The maximum flow rate set by the flow regulating valve can correspond to a maximum desired differential rate of rotation between a first driveline component and a second driveline component.

Another aspect of the present disclosure relates to a limited-slip driveline apparatus including a first driveline component that is rotatable relative to a second driveline component. The limited-slip driveline apparatus also includes a clutch configured to resist relative rotation between the first driveline component and the second driveline component at least when the clutch is actuated. The limited-slip driveline apparatus further includes an actuation arrangement for actuating the clutch. The actuation arrangement includes a hydraulic pump that pumps hydraulic fluid through a hydraulic circuit when relative rotation exists between the first driveline component and the second driveline component. Hydraulic pressure generated by the hydraulic pump within the hydraulic circuit is used to actuate the clutch. A flow regulating valve is provided for regulating a hydraulic fluid flow rate through the hydraulic circuit. The flow regulating valve is configured to prevent the hydraulic fluid flow rate from exceeding a set maximum flow rate regardless of a magnitude of the hydraulic pressure in the hydraulic circuit. The set maximum flow rate can correspond to a maximum desired rate of relative rotation between the first and second driveline components. In certain examples, the flow control valve is a pressure compensated flow control valve having a valve member that is spring-biased toward an open position. In an example embodiment, the limited-slip driveline apparatus is incorporated into a differential where the first driveline component is a side gear or output shaft of the differential and the second driveline component is a differential housing of the differential.

A further aspect of the present disclosure relates to a limited-slip driveline apparatus including a first driveline component that is rotatable relative to a second driveline component. The limited-slip driveline apparatus also includes a clutch configured to resist relative rotation between the first driveline component and the second driveline component at least when the clutch is actuated. The limited-slip driveline apparatus further includes an actuation arrangement for actuating the clutch. The actuation arrangement includes a hydraulic pump that pumps hydraulic fluid when relative rotation exists between the first and second driveline components. The hydraulic pump includes pump components that rotate in concert with the first and second driveline components. The actuation arrangement also includes a pressure chamber and a piston that actuates the clutch when the pressure chamber is pressurized by the hydraulic pump. The actuation arrangement further includes a hydraulic circuit configured to extend from a hydraulic fluid reservoir to an inlet of the hydraulic pump, from the inlet of the hydraulic pump through the hydraulic pump to an outlet of the hydraulic pump, from the outlet of the hydraulic pump to the pressure chamber and from the pressure chamber back to the fluid reservoir. The actuation arrangement additionally includes a flow regulating valve positioned between the pressure chamber and the reservoir for regulating a hydraulic fluid flow rate through the hydraulic circuit. The flow regulating valve is configured to prevent the hydraulic fluid flow rate from exceeding a set maximum flow rate regardless of a magnitude of the fluid pressure in the chamber. In one example, the limited-slip driveline apparatus is incorporated into a differential.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the examples disclosed herein are based.

DETAILED DESCRIPTION

Reference will now be made in detail to exemplary aspects of the present disclosure that are illustrated in the accompanying drawings. Wherever possible, the same reference numbers will be used throughout the drawings to refer to the same or like structures.

The present disclosure relates generally to a method and system for controlling operation of a hydraulically actuated driveline clutch used to limit relative rotation between first and second rotatable driveline components. In one example, the method and system involve directly regulating/controlling (e.g., limiting) a hydraulic fluid flow rate to limit the amount of rotational speed variance that is permitted between the first and second driveline components. While the hydraulic pressure within the system will vary as the flow rate is regulated, the pressure itself is preferably not specifically controlled. Instead, flow rate is the controlled parameter of the system. In an example system, the hydraulic flow rate through the hydraulic actuation circuit is directly related to and dependent on the relative rotational speed between the first and second driveline components. Thus, by limiting the hydraulic fluid flow rate, the relative rotational speed permitted between the first and second driveline components is also limited. It will be appreciated that the above-described control strategy based on flow rate allows for differences in rotational speed between the first and second driveline components to be effectively controlled (e.g., limited) without requiring the use of expensive electronic control components.

Figure 1:
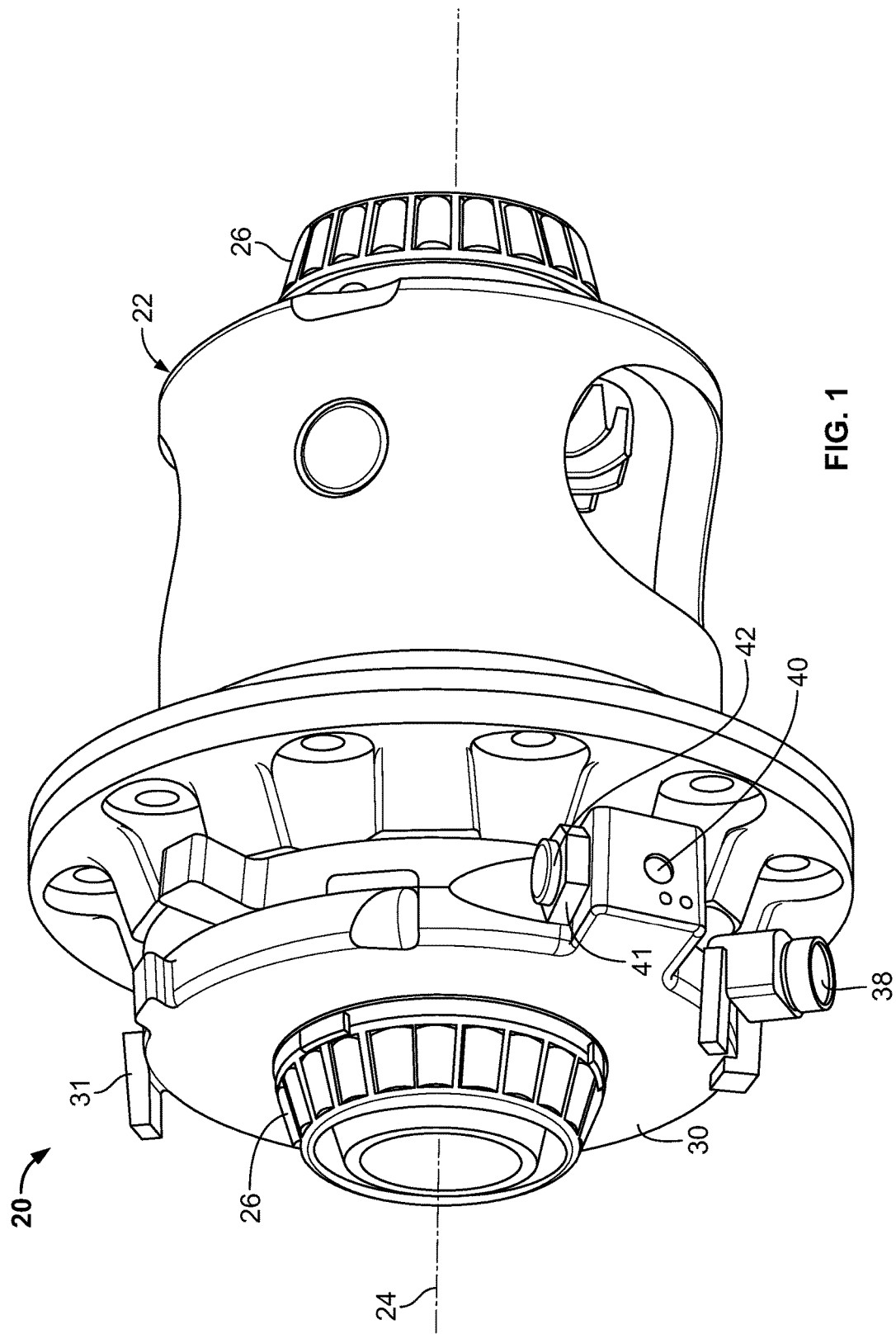
FIG. 1 is a perspective view of a differential incorporating a limited-slip driveline apparatus in accordance with the principles of the present disclosure.
Figure 2:
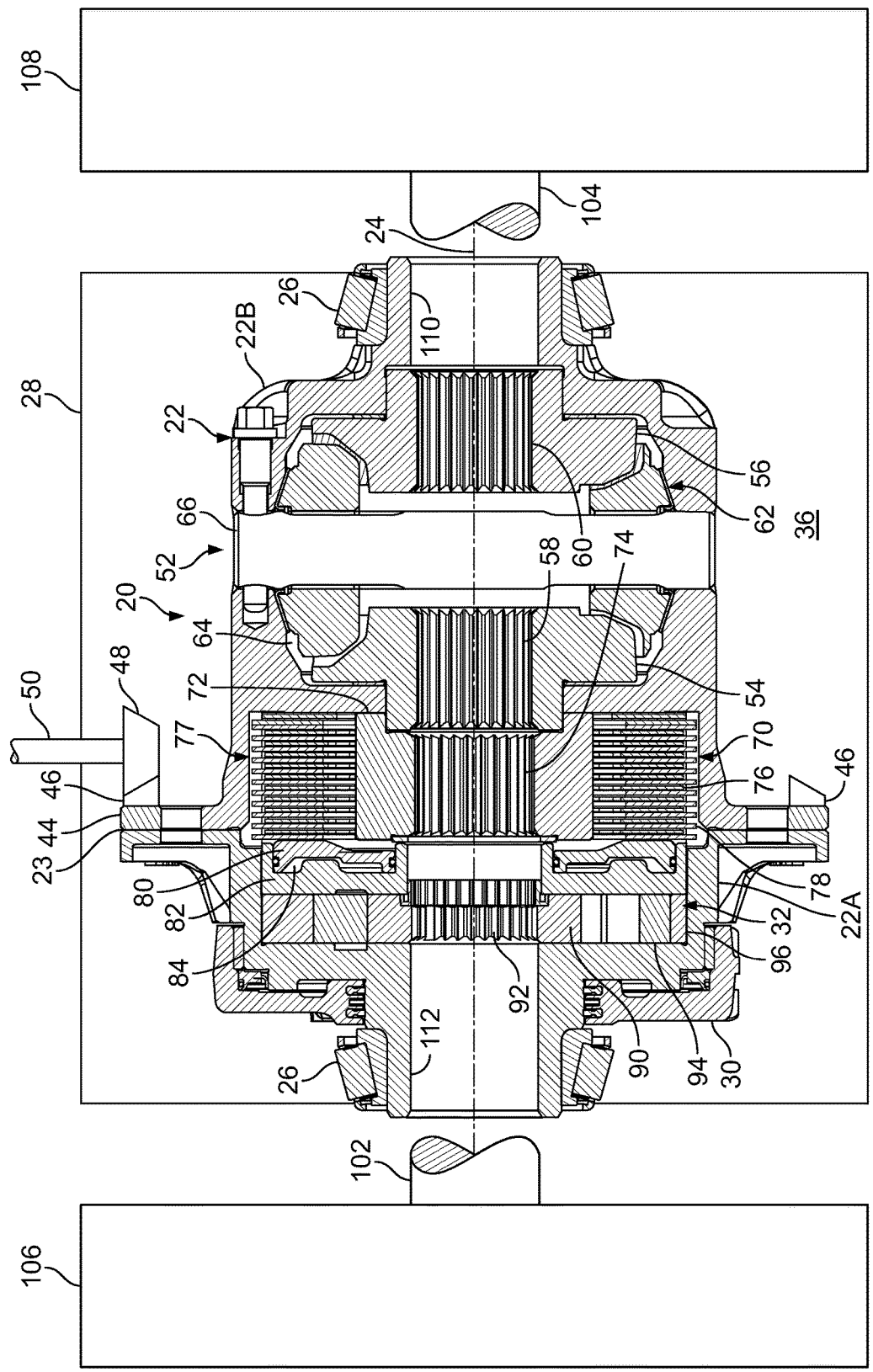
FIG. 2 is a cross-sectional view cut longitudinally through the differential of FIG. 2.
Figure 3:
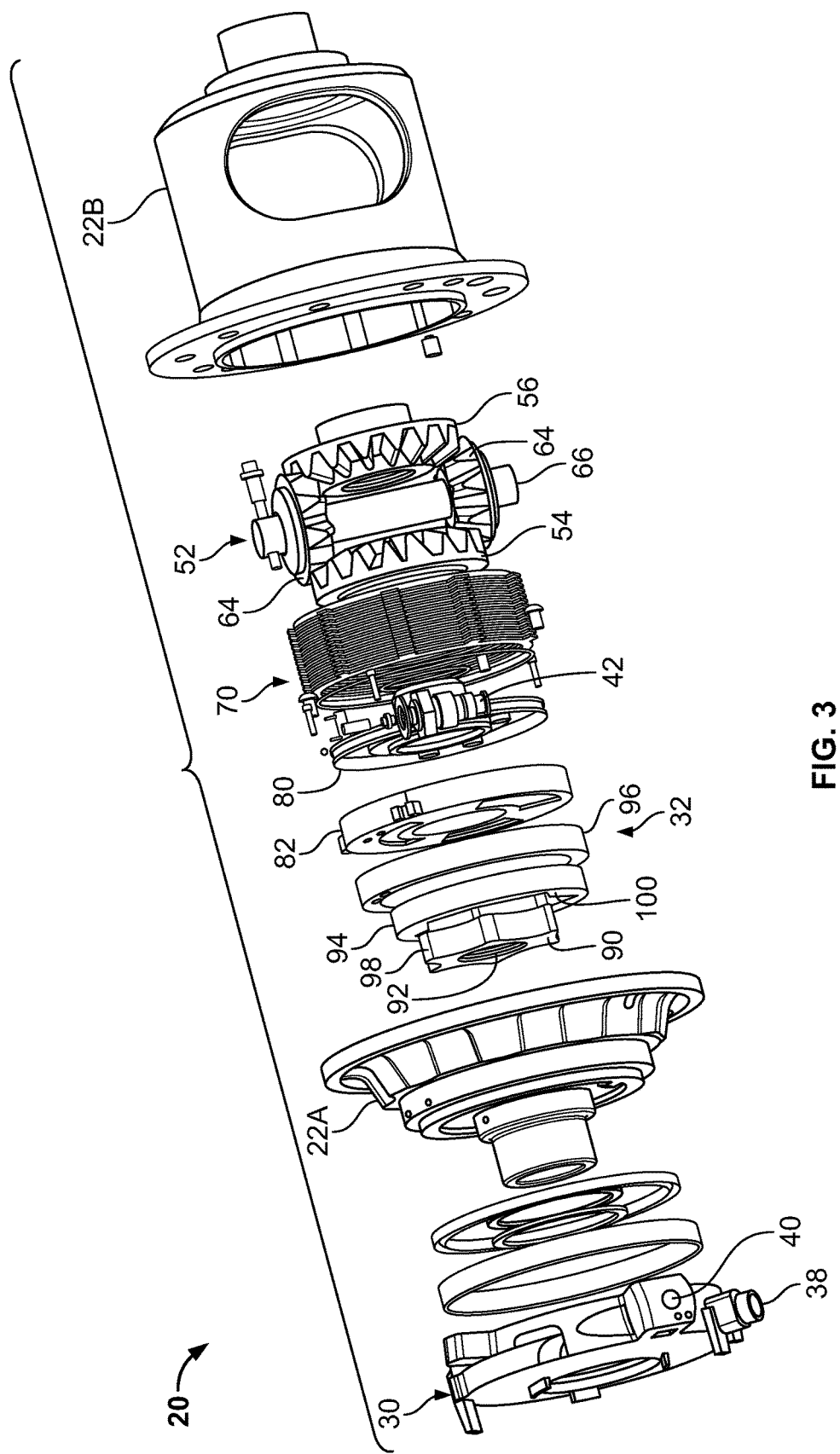
FIG. 3 is an exploded, perspective view of the differential of FIG. 1.

As disclosed herein in FIGS. 1-3, a limited-slip driveline apparatus in accordance with the principles of the present disclosure has been incorporated into a differential. It will be appreciated that while the limited-slip driveline apparatus has specifically been shown incorporated into a differential, the various aspects of the present disclosure are applicable to any type of driveline apparatus having a clutch for controlling relative rotation between two driveline components. As used herein, the term "clutch" means any structure that uses friction to control relative rotation between two components.

FIG. 1 illustrates a differential 20 incorporating a limited-slip driveline apparatus in accordance with the principles of the present disclosure. The differential 20 includes a differential housing 22 that in use is rotated about a rotation axis 24. Bearings 26 are provided at opposite ends of the differential housing 22. The bearings 26 are co-axially aligned along the rotation axis 24 and are configured for rotatably mounting the differential housing 22 within an outer housing 28 (e.g., a differential carrier as shown schematically in FIG. 2). The outer housing 28 contains a hydraulic fluid such as oil that can be used for lubricating various components (e.g. gears) within the outer housing 28 and the differential housing 22. A plenum housing 30 is mounted at one end of the differential housing 22. The differential housing 22 is rotatable relative to the plenum housing 30 about the rotation axis 24. The plenum housing 30 includes a tab 31 that engages the outer housing 28 to prevent relative rotation between the plenum housing 30 and the outer housing 28. A hydraulic fluid pump 32 (see FIGS. 2 and 3) is provided within the differential housing 22. The hydraulic fluid pump 32 is part of a hydraulic actuation circuit 34 (shown schematically at FIG. 4) that extends through the plenum housing 30 and the differential housing 22. The volume of oil within the outer housing 28 forms a reservoir 36 of the hydraulic circuit 34. The hydraulic fluid pump 32 draws oil from the reservoir 36 through an input port 38 defined by the plenum housing 30 and outputs oil back to the reservoir 36 through an output port 40 defined by the plenum housing 30. A flow regulating valve 42 regulates a hydraulic fluid flow rate through the hydraulic circuit 34. In one embodiment, the flow regulating valve 42 prevents the hydraulic fluid flow rate within the hydraulic actuation circuit 34 from exceeding a set maximum flow rate regardless of a magnitude of the fluid pressure generated by the hydraulic fluid pump 32 within the hydraulic circuit 34.

Referring to FIG. 2, the differential housing 22 includes a first housing piece 22A and a second housing piece 22B that meet at an interface 23. The housing pieces 22A, 22B can be secured together by fasteners, welding or other techniques. The differential housing 22 defines a flange 44 adjacent the interface 23 for mounting a ring gear 46. In use of the differential 20, the ring gear 46 intermeshes with a bevel gear 48 driven by a driveshaft 50. As the bevel gear 48 is rotated by the driveshaft 50, the bevel gear 48 engages the ring gear 46 thereby causing rotation of the differential housing 22 about the rotation axis 24.

Referring still to FIG. 2, the differential 20 includes a torque transfer arrangement 52 mounted within the second housing piece 22B. The torque transfer arrangement 52 includes first and second side gears 54, 56 (e.g., sun gears) that respectively define output shaft openings 58, 60 that are coaxially aligned along the rotation axis 24. The torque transfer arrangement 52 also includes a planetary gear set 62 mounted between the first and second side gears 54, 56. The planetary gear set 62 is configured for transferring torque between the differential housing 22 and the first and second side gears 54, 56 while concurrently permitting the first and second side gears 54, 56 to rotate relative to one another (e.g., at different rotational speeds) about the rotation axis 24. The planetary gear set 62 includes pinion gears 64 rotatably mounted on a shaft 66 fixed relative to the differential housing 22. Each of the pinion gears 64 intermeshes with both the first side gear 54 and the second side gear 56.

The differential 20 also includes a clutch 70 mounted within the second housing piece 22B. The clutch 70 includes a coupler 72 defining an output shaft opening 74 coaxially aligned with the rotation axis 24. The coupler 72 carries a plurality of a friction plates 76 that project radially outwardly from the main body of the coupler 72. The friction plates 76 are rotationally fixed relative to the main body of the coupler 72. The clutch 70 also includes a plurality of eared discs 78 that are carried by the differential housing 22. The discs 78 are rotationally fixed relative to the differential housing 22. The eared discs 78 are interleaved between the friction plates 76 to form a clutch pack 77. The clutch 70 is configured to resist relative rotation between the coupler 72 and the differential housing 22 at least when the clutch is actuated. When the clutch 70 is actuated, the friction plates 76 are preferably compressed against the eared discs 78 so that friction resists relative rotation between the friction plates 76 and the eared discs 78.

The differential 20 further includes an actuation arrangement for actuating the clutch 70 by compressing the clutch pack 77. The actuation arrangement includes a piston 80 mounted within a piston housing 82. A pressure chamber 84 is defined between the piston 80 and the piston housing 82. The piston 80 is moveable relative to the piston housing 82 along the rotation axis 24. The actuation arrangement also includes the hydraulic fluid pump 32. When the hydraulic fluid pump 32 pumps hydraulic fluid through the hydraulic actuation circuit 34, the pressure chamber 34 is pressurized thereby causing the piston 80 to slide along the rotation axis 24 toward the clutch pack 77. As the piston 80 is forced against the clutch pack 77 by hydraulic pressure within the pressure chamber 84, the friction plates 76 and the eared discs 78 are compressed together such that the clutch 70 is actuated. Meaningful braking/actuation of the clutch 70 does not take place until the hydraulic pressure in the pressure chamber 84 reaches a predetermined level.

The hydraulic fluid pump 32 of the differential 20 is depicted as a gerotor pump. The hydraulic fluid pump 32 includes an inner gear 90 having an output shaft opening 92 that is coaxially aligned with the rotation axis 24. The hydraulic fluid pump 32 also includes an outer gear 94 positioned outside the inner gear 90. The outer gear 94 is positioned within an eccentric sleeve 96. The eccentric sleeve 96 is coupled to the differential housing 22 so that the eccentric sleeve 96 is carried by the differential housing 22 as the differential housing 22 rotates about the rotation axis 24. In this way, the eccentric sleeve 96 is configured to rotate in concert with the differential housing 22. The inner and outer gears 90, 94 are free to move within the eccentric sleeve 96. As shown at FIG. 3, the inner gear 90 includes outer teeth 98 that engage inner teeth 100 of the outer gear 94. The inner teeth 100 of the outer gear 94 include one more tooth than the outer teeth 98 of the inner gear 90. When relative rotation is generated between the eccentric sleeve 96 and the inner gear 90, the teeth of the inner and outer gears 90, 94 cooperate to define a series of pockets having increasing and decreasing volumes which creates a pumping action. In this way, the inner and outer gears 90, 94 generate hydraulic fluid flow and corresponding hydraulic fluid pressure used for actuating the clutch 70. While gerotor pumps are preferred for the present application, it will be appreciated that other types of hydraulic pumps could be used as well.

In use of the differential 22, first and second output shafts 102, 104 (see FIG. 2) are preferably coupled to the differential 20. The first and second output shafts 102, 104 are shown coupled to respective first and second wheels 106, 108. The second output shaft 104 is rotatably received within an output shaft opening 110 defined by the second housing piece 22B of the differential housing 22. The second output shaft 104 is also rotationally fixed within the output shaft opening 60 of the second side gear 56 by means such as splines. The first output shaft 102 is rotatably received within an output shaft opening 112 defined by the first housing piece 22A. The first output shaft 102 is also rotationally fixed within the output shaft opening 92 defined by the inner gear 90 of the gerotor pump, the output shaft opening 74 defined by the coupler 72 of the clutch 70, and the output shaft opening 58 defined by the first side gear 54. It will be appreciated that splined connections can be used to provide the fixed rotational connection between the first output shaft 102 and the inner gear 90, the coupler 72 and the first side gear 54. In this way, the first side gear 54, the coupler 72, and the inner gear 90 all rotate in concert (i.e., unison) with the first output shaft 102 as the first output shaft 102 is rotated about the rotation axis 24. Because of this relationship, when the clutch 70 is actuated, the clutch functions to control the relative rotational speed between the entire assembly (i.e., the first output shaft 102, the inner gear 90, the coupler 72 and the first side gear 54) and the differential housing 22.

In view of the above, it will be appreciated the hydraulic pump 32 is coupled between the differential housing 22 and the first output shaft 102 so that relative rotation between the first output shaft 102 and the differential housing 22 causes the pump 32 to pump hydraulic fluid through the hydraulic actuation circuit 34. For example, the eccentric sleeve 96 is non-rotationally coupled to the differential housing 22 and the inner gear 90 is non-rotationally coupled to the first output shaft 102. Because the hydraulic pump 32 is coupled between the differential housing 22 and the first output shaft 102, the speed of the hydraulic pump and thus the flow rate generated by the pump is directly dependent on the relative rotational speed between the differential housing 22 and the first output shaft 102. In one example, the pump displaces a fixed volume of hydraulic fluid at a given relative rotational speed.

It will be appreciated that the limited-slip clutch apparatus is configured to allow a limited amount of relative rotation between the differential housing 22 and the first output shaft 102 while preventing the relative rotation from exceeding a predetermined rate. In one embodiment, the predetermined maximum amount of relative rotation permitted is about 60 rotations per minute. This rate of relative rotation is suitable for allowing the wheels 106, 108 to rotate at different speeds for accommodating turning/cornering. Relative rotational speeds greater than the predetermined maximum rate of relative rotation would indicate that one of the wheels 106, 108 is slipping (e.g., on ice or other slippery medium) and spinning at a high speed and the other of the wheels 106, 108 has stopped or significantly slowed due to lack of torque. In the case where the second wheel 108 slips and the first wheel 106 stops, the eccentric sleeve 96 coupled to the rotating differential housing 22 will drive the outer gear 94 about the inner gear 90 such that the hydraulic pump 32 pumps fluid through the actuation circuit 34 to actuate the clutch 70. In this situation, actuation of the clutch 70 causes increased torque to be transferred from the differential housing 22 to the first output shaft 102 thereby causing rotation of the first output shaft 102 and the first wheel 106. In the case where the first wheel 106 slips and the second wheel 108 stops, the inner gear 90 coupled to the first output shaft 102 (which is rotating faster than the differential housing 22) will drive the inner gear 90 relative to the outer gear 94 such that the hydraulic pump 32 pumps fluid through the actuation circuit 34 to actuate the clutch 70. In this situation, actuation of the clutch 70 brakes/resists rotation of the first output shaft 102 relative to the differential housing 22 causing increased torque to be transferred through the differential housing 22 and the torque transfer arrangement 52 to the second output shaft 104 thereby causing rotation of the second output shaft 104 and the first wheel 106.

Figure 5:
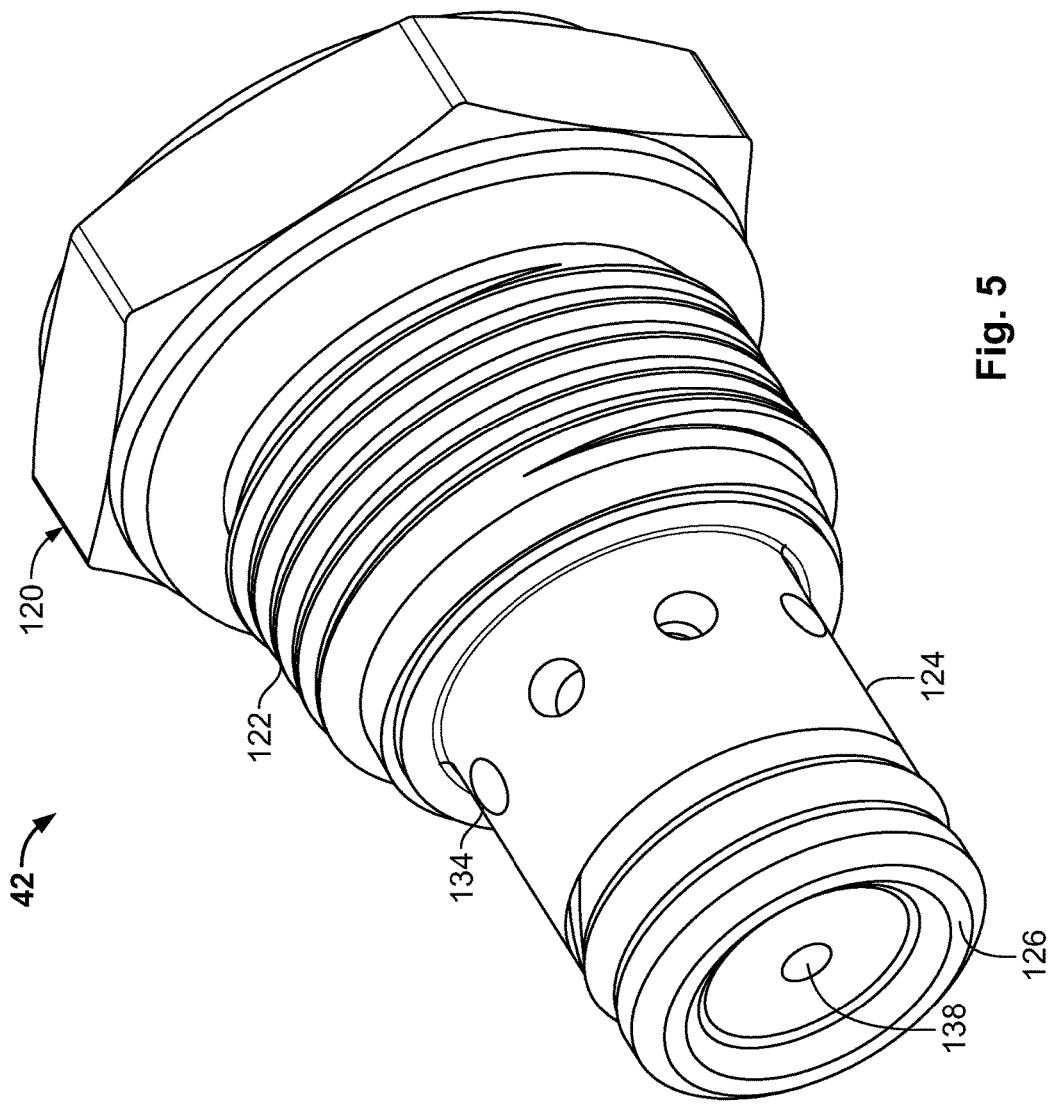
FIG. 5 is a perspective view of a pressure compensated flow regulating valve used in the differential of FIGS. 1-3.
Figure 6:
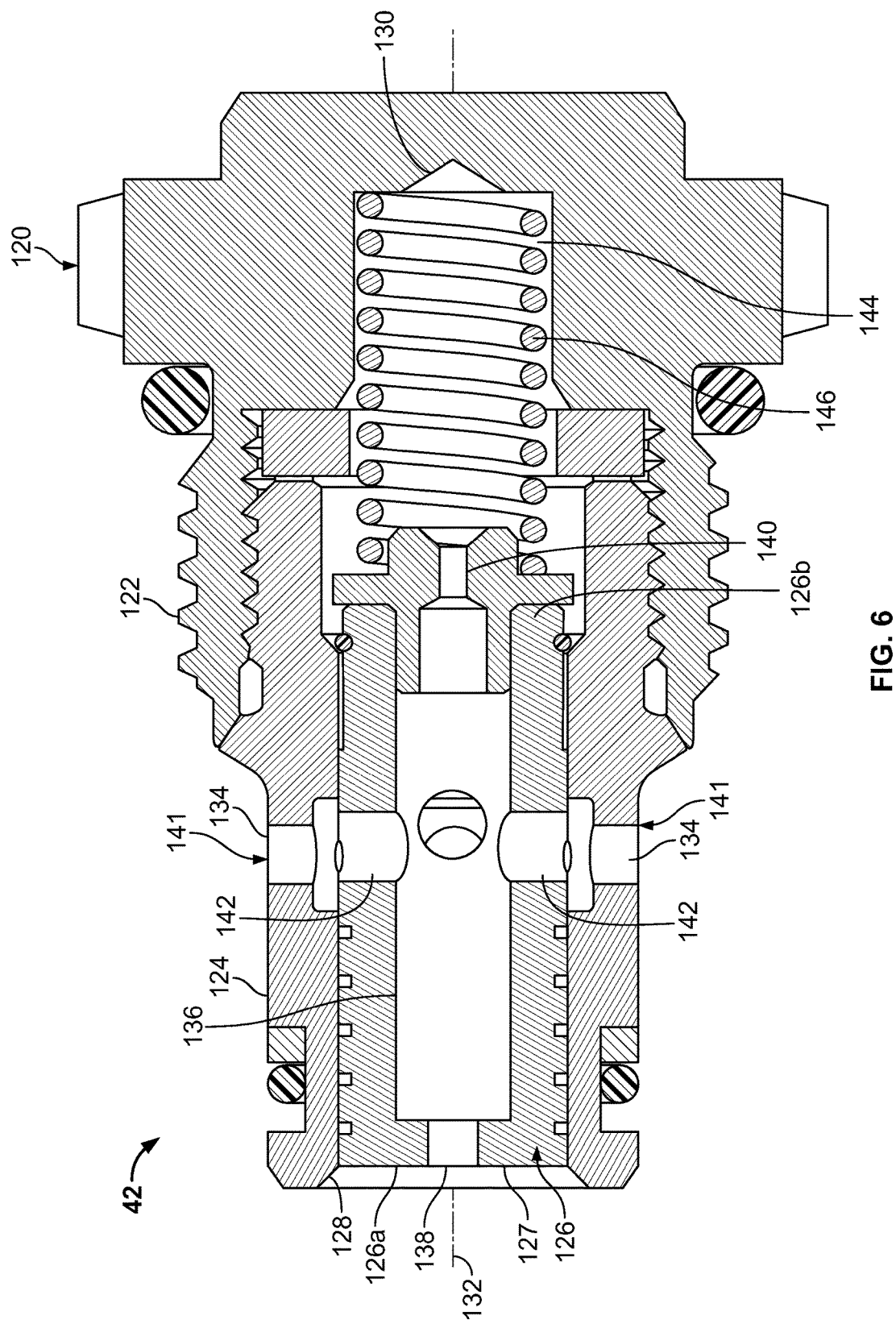
FIG. 6 is a cross-sectional view cut longitudinally through the pressure compensated flow regulating valve of FIG. 5.

Referring to FIGS. 5 and 6, the flow regulating valve 42 includes an outer body 120 having exterior threads 122 for threading the flow regulating valve 42 into a valve mounting port 41 defined by the plenum housing 30. The outer body 120 also forms a valve sleeve 124 that receives a valves piston 126. The valve sleeve 124 has an open end 128 positioned opposite from a closed end 130. The valve piston 126 is slidably mounted within the valve sleeve 124 and is configured to slide relative to the outer body 120 along an axis 132 defined by the valve sleeve 124. The valve sleeve 124 defines a plurality of outlet openings 134 at an intermediate location between the open and closed ends 128, 130. The outlet openings 134 are circumferentially spaced about the axis 132. The valve piston 126 defines an inner passage 136 that extends lengthwise through the valve piston 126. An inlet opening 138 (e.g., a fixed size orifice) is defined through one end 126a of the valve piston 126 and a pressure balancing vent 140 (e.g., a fixed size orifice) is defined though the opposite end 126b of the valve piston 126. The end 126a defines a piston face 127 of the valve piston 126. The inlet opening 138 and the pressure balancing vent 140 are both in fluid communication with the passage 136. The valve piston 126 also defines a plurality of outlet openings 142 positioned at an intermediate location along the length piston 126. The outlet openings 142 are circumferentially spaced about the axis 132 and are adapted to align with the outlet openings 134 of the valve sleeve 124 when the flow regulating valve 142 is in an open position. A spring chamber 144 is defined between the valve piston 126 and the closed end 130 of the valve sleeve 124. The pressure balancing vent 140 ensures that inner passage 136 and the spring chamber 144 become pressure balanced over time. A spring 146 is mounted in the chamber 144.

The inlet opening 138 of the valve piston 126 defines an inlet of the flow regulating valve 42 and the outlet openings 134, 142 cooperate to define a variable size outlet orifice 141 of the flow regulating valve 142. The spring 146 biases the valve piston 126 to an open position (shown at FIG. 6) in which the outlet openings 134, 142 substantially align with one another such that the outlet orifice 141 defines an orifice size (i.e., a cross-sectional area through which fluid can pass) that is large enough to accommodate a flow rate up to a set maximum flow rate value of the valve 42 without causing an increase in pressure within the actuation circuit 34 that is significant enough to cause actuation of the clutch 70. The set maximum flow rate value is the maximum flow rate permitted by the valve regardless of the hydraulic circuit pressure. The set maximum flow rate value can also be referred to as an established or predetermined maximum flow rate value. Once the flow passing through the flow regulating valve 42 reaches the set maximum flow rate of the flow regulating valve 42, the flow regulating valve 42 begins to regulate the flow so that the flow does not exceed the set maximum flow rate regardless of the hydraulic pressure upstream of the valve 42. The valve 42 regulates the flow rate by decreasing the orifice size 141 in a controlled manner. When the valve 42 begins regulating the flow to prevent the set maximum flow rate from being exceeded, the hydraulic pressure within the hydraulic actuation circuit 34 upstream of the valve 42 reaches a level that is high enough to cause meaningful actuation of the clutch 70. It will be appreciated that the magnitude of braking force provided by the clutch 70 is directly related to and dependent upon the level of pressure in the hydraulic actuation circuit 34.

As the valve piston 126 is moved toward a closed position (i.e., a position in which the variable size orifice 141 is closed), the spring 146 applies a spring force to the valve piston 126 that resists movement of the valve piston 126 toward the closed position. The valve piston 126 moves toward the closed position as the valve piston 126 moves toward the closed end 130 of the sleeve 124. The size of the orifice 141 decreases as the valve piston 126 moved from the open position toward the closed position. In one example, the spring 146 applies a progressively increasing resistive spring load to the valve piston 126 as the valve piston 126 moves toward the closed position and the spring 146 is compressed. Thus, in such an example, the closer the valve piston 126 gets to the closed position, the more the spring resists movement of the valve piston 126 toward the closed position.

Flow regulation occurs when hydraulic pressure within the system upstream of the inlet opening 138 applies pressure to the piston face 127 and forces the valve piston 126 toward the closed position against the bias of the spring 146 so as to reduce the size of the variable orifice 141. To prevent the flow rate of the hydraulic circuit 34 from exceeding the maximum flow rate of the valve 42 regardless the pressure upstream of the inlet opening 138, the valve 42 controls the size of the orifice 142. In one embodiment, during flow regulation, the valve piston 126 oscillates back and forth along the axis 132 thereby repeatedly increasing and decreasing the size of the outlet orifice 141 in a controlled manner so as to limit the flow through the valve 42 to the set maximum flow rate of the valve. The movement of the valve piston 126 is controlled by the spring force of the spring 146 combined with a hydraulic pressure force caused by hydraulic fluid pressure applied to the piston face 127 of the valve piston 126 as well as a hydraulic pressure force generated by hydraulic pressure in the spring chamber 144. The spring 146 cooperates with the hydraulic pressure in the spring chamber 144 to force the valve piston 126 toward the open position. It will be appreciated that pressure compensated flow regulating valves are well known and can have a variety of different configurations. The depicted flow regulating valve 42 is but one example of a flow regulating valve that could be used, and clearly other known valve configurations suitable for limiting flow to a certain flow rate regardless of hydraulic circuit pressure can also be used.

Figure 4:
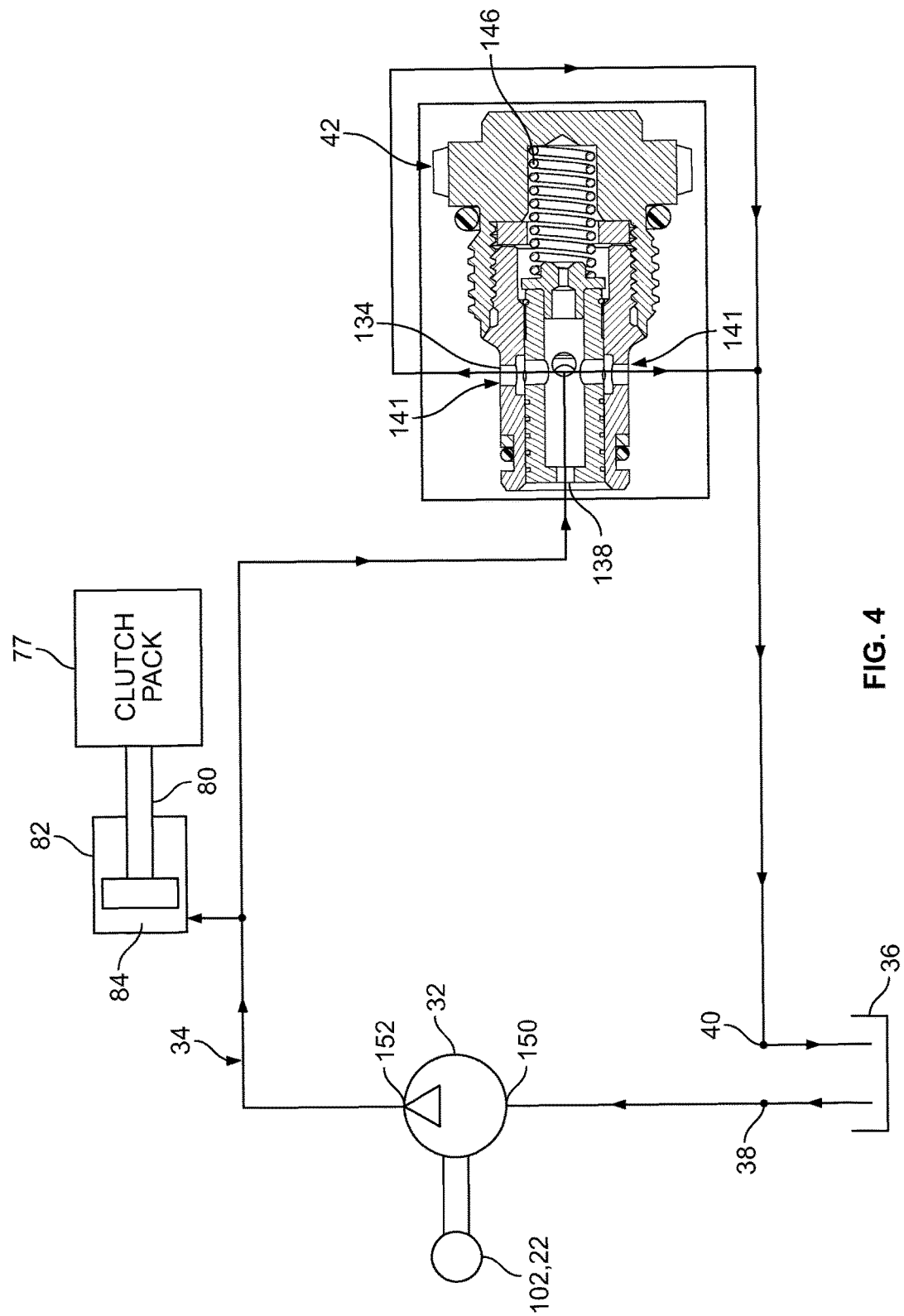
FIG. 4 schematically depicts a hydraulic actuation circuit of the limited-slip driveline apparatus incorporated into the differential of FIG. 1.

Referring still to FIG. 4, when the flow regulating valve 42 is mounted within the valve mounting opening 41 of the plenum housing 30, the inlet port 138 is placed in fluid communication with the pressure chamber 84 and the variable size outlet orifice 141 is placed in fluid communication with the outlet port 40. The hydraulic actuation circuit 34 of the actuator arrangement extends from the reservoir 36 through the input port 38 of the plenum housing 30 to an inlet 150 of the hydraulic fluid pump 32. The hydraulic circuit 34 then passes through the hydraulic fluid pump 32 to an outlet 152 of the hydraulic fluid pump 32. From the outlet 152 of the hydraulic fluid pump 32, the hydraulic circuit 34 extends to the pressure chamber 84. From the pressure chamber 84, the hydraulic circuit 34 extends back through the differential housing 22 and the plenum housing 30 to the inlet opening 138 of the flow regulating valve 42. From the inlet opening 138 the hydraulic circuit 34 extends through the valve 42 to the outlet orifice 141. The hydraulic circuit 134 then extends from the outlet orifice 141 to the output port 40 back to the reservoir 36.

When the first and second output shafts 102, 104 mounted within the differential 22 are caused to rotate at different rates about the rotation axis 24, relative rotation is generated between the first output shaft 102 and the differential housing 22. This relative rotation generates relative rotation between the sleeve 96 and the inner gear 90 of the hydraulic fluid pump 32 thereby causing the hydraulic fluid pump 32 to draw hydraulic fluid from the reservoir 36 through the input port 38 and into the inlet 150 of the hydraulic fluid pump 32. The hydraulic fluid then flows through the hydraulic fluid pump 32 and is discharged from the outlet 152 of the hydraulic fluid pump 32 toward the pressure chamber 84. The fluid flow within the hydraulic circuit 34 flow then proceeds from the pressure chamber 84 to the flow regulating valve 42. The flow enters the flow regulating valve 42 through the inlet port 38 and exits through the outlet orifice 141. As long as the flow rate is below the set maximum flow rate of the flow regulating valve 42, the spring 146 retains the flow regulating valve 42 in the full open position and flow proceeds unregulated through the outlet orifice 141 and back to the reservoir 36 through the outlet port 40. In this situation, the hydraulic pressure upstream of the flow regulating valve 42 (i.e., the hydraulic pressure provided at the pressure chamber 84) is sufficiently low that no meaningful actuation of the clutch 70 occurs.

It will be appreciated that the flow rate generated by the hydraulic fluid pump 32 is directly related (e.g., directly proportional) to the relative rotational speed between the first output shaft 102 and the differential housing 22. Thus, as the relative rotational speed between the first output shaft 102 and the differential housing 22 increases, the flow rate generated by the hydraulic fluid pump 22 increases accordingly until the flow rate reaches the set maximum flow rate of the valve 42. When the flow rate generated by the hydraulic fluid pump 32 reaches the set maximum flow rate of the flow regulating valve 42, the flow regulating valve 42 begins to regulate flow by varying the size of the orifice 141 so that the flow passing through the flow regulating valve 42 does not exceed the set maximum flow rate regardless of the pressure within the circuit 34.

When the flow regulating valve 42 regulates flow by restricting the outlet orifice 141, the hydraulic pressure within the hydraulic actuating circuit 34 upstream of the valve 42 increases thereby increasing the force supplied by the piston 90 to the clutch pack 77 to a level where meaningful actuation/braking occurs. In this way, the increased hydraulic pressure provides an increased breaking action that prevents the relative rotational speed between the first output shaft 102 and the differential housing 22 from exceeding a predetermined value corresponding to the set maximum flow rate of the flow regulating valve 42. In one example embodiment, the set maximum flow rate passing through the flow regulating valve 42 equals 0.25 gallons per minute and the maximum relative rotational speed between the first output shaft 102 and the differential housing 22 is 60 rotations per minute.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What is claimed is:

1. A limited-slip driveline apparatus comprising:
   a first driveline component that is rotatable relative to a second driveline component;
   a clutch configured to resist relative rotation between the first driveline component and the second driveline component at least when the clutch is actuated;
   an actuation arrangement for actuating the clutch, the actuation arrangement including:
   a hydraulic pump that pumps hydraulic fluid through a hydraulic circuit when relative rotation exists between the first and second driveline components, wherein hydraulic pressure generated by the hydraulic pump within the hydraulic circuit is used to actuate the clutch; and
   a flow regulating valve having a valve sleeve and a valve piston slidably mounted within the valve sleeve, the valve sleeve defining at least one outlet opening and the valve piston defining at least one outlet opening cooperating to define a variable size outlet orifice of the flow regulating valve for regulating a hydraulic fluid flow rate through the hydraulic circuit, the flow regulating valve being configured to reduce the size of the variable outlet orifice of the flow regulating valve to prevent the hydraulic fluid flow rate from exceeding a set maximum flow rate regardless of a magnitude of the hydraulic pressure in the hydraulic circuit.

2. The limited-slip apparatus of claim 1, wherein the set maximum flow rate corresponds to a maximum desired rate of rotation of the first driveline component relative to the second driveline component.

3. The limited-slip apparatus of claim 1, wherein the flow control valve is a pressure compensated flow control valve having a valve member that is spring-biased toward an open position.

4. The limited-slip apparatus of claim 1, wherein the hydraulic fluid flow rate is related directly to a rate of rotation of the first driveline component relative to the second driveling component.

5. The limited-slip apparatus of claim 1, wherein the hydraulic pump includes a gerotor pump.

6. The limited-slip apparatus of claim 5, wherein the limited slip apparatus is incorporated into a differential configured for transferring torque between a drive shaft and first and second output shafts, the differential including a differential housing that receives the first and second output shafts, wherein the first output shaft is the first driveline component and the differential housing is the second driveline component, and wherein the gerotor pump is mounted within the differential housing.

7. The limited-slip apparatus of claim 1, wherein the limited slip apparatus is incorporated into a differential configured for transferring torque between a drive shaft and first and second output shafts, the differential including a differential housing that receives the first and second output shafts, and wherein the first output shaft is the first driveline component and the differential housing is the second driveline component.

8. The limited-slip apparatus of claim 1, wherein the limited slip apparatus is incorporated into a differential including a differential housing, the differential including first and second side gears that respectively define first and second output shaft openings aligned along a rotation axis, the torque transfer arrangement being configured to transfer torque between the differential housing and the first and second side gears while concurrently permitting differential rotation of the first and second side gears about the rotation axis.

9. The limited slip apparatus of claim 1, wherein the actuation arrangement includes a pressure chamber in fluid communication with an outlet of the hydraulic pump and a piston that actuates the clutch when the pressure chamber is pressurized by the hydraulic pump.

10. The limited slip apparatus of claim 9, wherein the hydraulic circuit is configured to extend from a fluid reservoir to an inlet of the hydraulic pump, from the inlet of the hydraulic pump through the hydraulic pump to the outlet of the hydraulic pump, from the outlet of the hydraulic pump to the pressure chamber and from the pressure chamber back to the fluid reservoir, and wherein the flow regulating valve is positioned between the pressure chamber and the reservoir.

11. A limited-slip driveline apparatus comprising:
a first driveline component that is rotatable relative to a second driveline component;
a clutch configured to resist relative rotation between the first driveline component and the second driveline component at least when the clutch is actuated;
an actuation arrangement for actuating the clutch, the actuation arrangement including:
 a hydraulic pump that pumps hydraulic fluid when relative rotation exits between the first and second driveline components;
 a pressure chamber;
 a piston that actuates the clutch when the pressure chamber is pressurized with hydraulic fluid from the hydraulic pump;
 a hydraulic circuit configured to extend from a fluid reservoir to an inlet of the hydraulic pump, from the inlet of the hydraulic pump through the hydraulic pump to an outlet of the hydraulic pump, from the outlet of the hydraulic pump to the pressure chamber and from the pressure chamber back to the fluid reservoir; and
 a flow regulating valve positioned between the pressure chamber and the reservoir and having a valve sleeve and a valve piston slidably mounted within the valve sleeve, the valve sleeve defining at least one outlet opening and the valve piston defining at least one outlet opening cooperating to define a variable size outlet orifice of the flow regulating valve for regulating a hydraulic fluid flow rate through the hydraulic circuit, the flow regulating valve being configured to reduce the size of the variable outlet orifice of the flow regulating valve to prevent the hydraulic fluid flow rate from exceeding a set maximum flow rate regardless of a magnitude of fluid pressure in the pressure chamber.

12. The limited-slip apparatus of claim 11, wherein the hydraulic fluid flow rate is related directly to a rate of rotation of the first driveline component relative to the second driveline component.

13. The limited-slip apparatus of claim 11, wherein the hydraulic pump includes a gerotor pump.

14. The limited-slip apparatus of claim 11, wherein the set maximum flow rate corresponds to a maximum desired rate of rotation of the first driveline component relative to the second driveline component.

15. The limited-slip apparatus of claim 11, wherein the flow control valve is a pressure compensated flow control valve having a valve member that is spring-biased toward an open position.

16. A limited-slip differential comprising:
a differential housing;
a torque transfer arrangement including first and second side gears that respectively define first and second output shaft openings aligned along a rotation axis, the torque transfer arrangement being configured to transfer torque between the differential housing and the first and second side gears while concurrently permitting differential rotation of the first and second side gears about the rotation axis;
a clutch configured to resist relative rotation between the first side gear and the differential housing at least when the clutch is actuated;
an actuation arrangement for actuating the clutch, the actuation arrangement including:
 a hydraulic pump positioned within the differential housing that pumps hydraulic fluid when relative rotation exists between the first side gear and the differential housing;
 a pressure chamber;
 a piston that actuates the clutch when the pressure chamber is pressurized by the hydraulic pump;
 a hydraulic circuit configured to extend from a fluid reservoir to the hydraulic pump, from the hydraulic pump to the pressure chamber and from the pressure chamber back to the fluid reservoir; and
 a flow regulating valve having a valve sleeve and a valve piston slidably mounted within the valve sleeve, the valve sleeve defining at least one outlet opening and the valve piston defining at least one outlet opening cooperating to define a variable size outlet orifice of the flow regulating valve for regulating a hydraulic fluid flow rate between the pressure chamber and the fluid reservoir, the flow regulating valve being configured to reduce the size of the variable outlet orifice of the flow regulating valve to prevent the hydraulic fluid flow rate between the pressure chamber and the fluid reservoir from exceeding a set maximum flow rate regardless of a magnitude of fluid pressure in the pressure chamber.

17. The limited-slip differential of claim 16, wherein the hydraulic fluid flow rate is related directly to a rate of rotation of the first side gear relative to the differential housing.

18. The limited-slip differential of claim 16, wherein the set maximum flow rate equals 0.25 gallons per minute and the rate of rotation of the first side gear relative to the differential housing equals 60 rotations per minute when the hydraulic fluid flow rate equals the set maximum flow rate.

19. The limited-slip differential of claim 16, wherein the hydraulic pump includes a gerotor pump.

20. The limited-slip differential of claim 16, wherein the set flow rate corresponds to a maximum desired rate of rotation of the first side gear relative to the differential housing.

21. The limited-slip differential of claim 16, wherein the flow control valve is a pressure compensated flow control valve having a valve member that is spring-biased toward an open position.

22. The limited-slip differential of claim 16, wherein the torque transfer arrangement includes a plurality of planetary pinion gears rotatably mounted within the differential housing, the planetary pinion gears being mounted between the first and second side gears and being configured to intermesh with the first and second side gears such that when the differential housing is rotated about the rotation axis the planetary pinion gears are configured to transfer torque from the differential housing to the first and second side gears while concurrently permitting differential rotation of the firsts and second side gears about the rotation axis.

23. The limited-slip differential of claim 16, further comprising a plenum housing mounted to the differential housing, the differential housing being rotatable relative to the plenum housing about the rotation axis, the plenum housing defining an exterior inlet port in fluid communication with an inlet of the hydraulic pump, the plenum housing also defining an exterior outlet port in fluid communication with the pressure chamber.

24. A limited-slip driveline apparatus comprising:
a first driveline component that is rotatable relative to a second driveline component;
a clutch configured to resist relative rotation between the first driveline component and the second driveline component at least when the clutch is actuated;
an actuation arrangement for actuating the clutch, the actuation arrangement including:
a hydraulic pump that pumps hydraulic fluid through a hydraulic circuit when relative rotation exists between the first and second driveline components, wherein hydraulic pressure generated by the hydraulic pump within the hydraulic circuit is used to actuate the clutch; and
a flow regulating valve having a valve sleeve and a valve piston slidably mounted within the valve sleeve, the valve sleeve defining at least one outlet opening and the valve piston defining at least one outlet opening cooperating to define a variable size outlet orifice of the flow regulating valve for regulating a hydraulic fluid flow rate through the hydraulic circuit, the flow regulating valve being configured to reduce the size of the variable outlet orifice of the flow regulating valve to prevent the hydraulic fluid flow rate from exceeding a set maximum flow rate.

* * * * *